(12) United States Patent
Abedini et al.

(10) Patent No.: US 11,197,324 B2
(45) Date of Patent: Dec. 7, 2021

(54) NR RACH MSG3 AND MSG4 RESOURCE CONFIGURATION FOR CV2X

(71) Applicant: QUALCOMM Incorporated, San Diego, CA (US)

(72) Inventors: Navid Abedini, Somerset, NJ (US); Zhibin Wu, Sunnyvale, CA (US); Sudhir Kumar Baghel, Hillsborough, NJ (US); Junyi Li, Chester, NJ (US); Kapil Gulati, Dover, DE (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/277,929

(22) Filed: Feb. 15, 2019

(65) Prior Publication Data
US 2019/0268944 A1 Aug. 29, 2019

Related U.S. Application Data

(60) Provisional application No. 62/634,470, filed on Feb. 23, 2018.

(51) Int. Cl.
| | |
|---|---|
| *H04W 74/08* | (2009.01) |
| *H04W 72/04* | (2009.01) |
| *H04W 4/40* | (2018.01) |
| *H04W 8/00* | (2009.01) |

(52) U.S. Cl.
CPC ......... *H04W 74/0833* (2013.01); *H04W 4/40* (2018.02); *H04W 8/005* (2013.01); *H04W 72/0446* (2013.01); *H04W 72/0453* (2013.01); *H04W 72/0493* (2013.01); *H04W 74/08* (2013.01)

(58) Field of Classification Search
CPC ... H04W 74/0833; H04W 74/08; H04W 4/40; H04W 72/0446; H04W 72/0453; H04W 72/0493; H04W 8/005; H04W 48/14; H04W 28/04; H04W 48/16; H04W 72/02; H04W 74/008
See application file for complete search history.

(56) References Cited

U.S. PATENT DOCUMENTS

| | | | |
|---|---|---|---|
| 9,282,577 B2 * | 3/2016 | Nishio | ................. H04J 11/0079 |
| 9,674,760 B2 * | 6/2017 | Kim | ...................... H04W 76/14 |
| 10,165,601 B2 * | 12/2018 | Meyer | ............... H04W 74/0833 |

(Continued)

FOREIGN PATENT DOCUMENTS

| | | | | |
|---|---|---|---|---|
| CN | 201710459670 | * | 6/2017 | |
| WO | WO-2020083190 A1 | * | 4/2020 | ........ H04W 74/0833 |

OTHER PUBLICATIONS

International Search Report and Written Opinion—PCT/US2019/018611—ISA/EPO—dated May 15, 2019.

*Primary Examiner* — Wutchung Chu
(74) *Attorney, Agent, or Firm* — Arent Fox LLP

(57) ABSTRACT

Various aspects described herein relate to techniques for resource configuration for random access in a wireless communication system (e.g., a cellular vehicle-to-everything (CV2X) communication system). In an aspect, the method includes identifying a set of one or more random access channel (RACH) resources and configuration, sending a first RACH message including the set, and receiving a second RACH message including a resource selected from the set.

28 Claims, 7 Drawing Sheets

(56) References Cited

U.S. PATENT DOCUMENTS

| | | | |
|---|---|---|---|
| 10,382,978 B2* | 8/2019 | Lee | H04L 5/0048 |
| 10,477,587 B2* | 11/2019 | Handler | H04B 17/336 |
| 10,660,133 B2* | 5/2020 | Choi | H04W 72/0413 |
| 10,784,950 B2* | 9/2020 | Kang | H04W 48/16 |
| 10,966,256 B2* | 3/2021 | Qian | H04W 76/11 |
| 2009/0225701 A1* | 9/2009 | Kwon | H04L 1/0006 |
| | | | 370/328 |
| 2012/0188958 A1* | 7/2012 | Suzuki | H04W 72/0413 |
| | | | 370/329 |
| 2013/0157670 A1* | 6/2013 | Koskela | H04W 76/14 |
| | | | 455/450 |
| 2014/0169260 A1* | 6/2014 | Nishio | H04J 3/0635 |
| | | | 370/312 |
| 2014/0204847 A1* | 7/2014 | Belleschi | H04W 76/14 |
| | | | 370/329 |
| 2014/0206322 A1* | 7/2014 | Dimou | H04W 76/14 |
| | | | 455/414.1 |
| 2014/0328329 A1* | 11/2014 | Novlan | H04W 56/002 |
| | | | 370/336 |
| 2015/0016312 A1* | 1/2015 | Li | H04W 74/006 |
| | | | 370/280 |
| 2015/0146668 A1* | 5/2015 | Liu | H04L 27/2613 |
| | | | 370/329 |
| 2015/0282215 A1* | 10/2015 | Eriksson | H04W 74/0833 |
| | | | 370/329 |
| 2016/0255616 A1* | 9/2016 | Martin | H04W 72/048 |
| | | | 370/330 |
| 2017/0207843 A1* | 7/2017 | Jung | H04B 7/0695 |
| 2017/0231011 A1* | 8/2017 | Park | H04W 74/006 |
| 2018/0020487 A1* | 1/2018 | Tsai | H04W 74/004 |
| 2018/0084585 A1* | 3/2018 | Lee | H04W 74/0833 |
| 2018/0110020 A1* | 4/2018 | Sahlin | H04L 5/0048 |
| 2018/0139783 A1* | 5/2018 | Park | H04W 88/08 |
| 2018/0235020 A1* | 8/2018 | Maaref | H04W 4/08 |
| 2018/0255589 A1* | 9/2018 | Patil | H04W 74/0875 |
| 2018/0279136 A1* | 9/2018 | Tsai | H04W 72/046 |
| 2018/0279364 A1* | 9/2018 | Hui | H04W 74/0833 |
| 2018/0287860 A1* | 10/2018 | Xia | H04L 5/0091 |
| 2018/0302889 A1* | 10/2018 | Guo | H04B 7/0617 |
| 2018/0324623 A1* | 11/2018 | Jung | H04W 72/005 |
| 2018/0324850 A1* | 11/2018 | Amuru | H04L 5/0053 |
| 2018/0324864 A1* | 11/2018 | Jung | H04W 72/005 |
| 2018/0343043 A1* | 11/2018 | Hakola | H04B 7/0417 |
| 2019/0037605 A1* | 1/2019 | Agiwal | H04W 24/10 |
| 2019/0104549 A1* | 4/2019 | Deng | H04W 72/0446 |
| 2019/0104554 A1* | 4/2019 | Amuru | H04W 72/042 |
| 2019/0174551 A1* | 6/2019 | Liu | H04L 5/0048 |
| 2019/0182682 A1* | 6/2019 | Kim | H04W 74/0833 |
| 2019/0208436 A1* | 7/2019 | Zhou | H04B 17/327 |
| 2019/0223157 A1* | 7/2019 | Hwang | H04W 74/0833 |
| 2019/0223166 A1* | 7/2019 | Liu | H04W 72/042 |
| 2019/0230714 A1* | 7/2019 | Liu | H04W 74/0833 |
| 2019/0253949 A1* | 8/2019 | Park | H04W 36/305 |
| 2019/0335510 A1* | 10/2019 | Ling | H04B 7/063 |
| 2019/0342822 A1* | 11/2019 | Ohara | H04W 74/08 |
| 2019/0349873 A1* | 11/2019 | Ohara | H04W 52/36 |
| 2019/0350006 A1* | 11/2019 | Qian | H04W 74/0833 |
| 2019/0373642 A1* | 12/2019 | Suzuki | H04W 74/0833 |
| 2019/0380139 A1* | 12/2019 | Xiong | H04W 72/044 |
| 2019/0393992 A1* | 12/2019 | Xiong | H04L 5/0007 |
| 2020/0015266 A1* | 1/2020 | Yan | H04W 74/0833 |
| 2020/0036430 A1* | 1/2020 | Kim | H04B 7/088 |
| 2020/0037345 A1* | 1/2020 | Ryoo | H04W 72/1284 |
| 2020/0045742 A1* | 2/2020 | Suzuki | H04W 74/0833 |
| 2020/0068489 A1* | 2/2020 | Li | H04W 74/0833 |
| 2020/0100311 A1* | 3/2020 | Cirik | H04W 74/042 |
| 2020/0120719 A1* | 4/2020 | Wang | H04W 72/1268 |
| 2020/0163119 A1* | 5/2020 | Liu | H04W 72/046 |
| 2020/0178318 A1* | 6/2020 | Yu | H04W 74/08 |
| 2020/0214047 A1* | 7/2020 | Chen | H04W 72/0406 |
| 2020/0221508 A1* | 7/2020 | Huang | H04W 68/005 |
| 2020/0229235 A1* | 7/2020 | Lu | H04W 74/0833 |
| 2020/0275379 A1* | 8/2020 | Sun | H04W 52/146 |
| 2020/0314760 A1* | 10/2020 | Ye | H04W 74/006 |
| 2020/0351748 A1* | 11/2020 | Jung | H04L 1/20 |

* cited by examiner

US 11,197,324 B2

NR RACH MSG3 AND MSG4 RESOURCE CONFIGURATION FOR CV2X

CLAIM OF PRIORITY UNDER 35 U.S.C. § 119

This application claims priority to U.S. Provisional Application No. 62/634,470, titled "NR RACH MSG3 AND MSG4 RESOURCE CONFIGURATION FOR CV2X," filed Feb. 23, 2018, which is assigned to the assignee hereof, and incorporated herein by reference in its entirety.

BACKGROUND

Technical Field

The present disclosure relates generally to communication systems, and more particularly, techniques for cellular vehicle-to-everything (CV2X) in 5G New Radio (NR).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, CV2X communications may include devices discovering and communicating with other nearby devices. Accessing techniques used with various frequency bands in NR may complicate existing access procedures. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method related to resource configuration for random access in a wireless communication system (e.g., a CV2X communication system) is provided. In an aspect, the method includes identifying a set of one or more random access channel (RACH) resources and configuration, sending a first RACH message including the set, and receiving a second RACH message including a resource selected from the set.

In another aspect, the disclosure includes a host device for wireless communications (e.g., CV2X communications). The host device may include a memory and a processor communicatively coupled with the memory. The processor may be configured to identify a set of one or more random access channel (RACH) resources and configuration, send a first RACH message including the set, and receive a second RACH message including a resource selected from the set.

In another aspect, the disclosure includes a host device for wireless communications (e.g., CV2X communications). The host device may include means to identify a set of one or more random access channel (RACH) resources and configuration, means to send a first RACH message including the set, and means to receive a second RACH message including a resource selected from the set.

In another aspect, the disclosure includes a non-transitory computer-readable medium storing computer-executable instructions executable by a processor. The computer-readable medium may include instructions to identify a set of one or more random access channel (RACH) resources and configuration, send a first RACH message including the set, and receive a second RACH message including a resource selected from the set.

In another aspect, a method related to resource configuration for random access in a wireless communication system (e.g., a CV2X communication system) is provided. The method includes initiating a random access procedure, receiving a first RACH message including a set of one or more RACH resources and configuration in response to the initiation, selecting a resource from the set of one or more RACH resources, and sending a second RACH message based on the selected resource and a schedule of the UE.

In another aspect, the disclosure includes a user equipment (UE) for wireless communications (e.g., CV2X communications). The UE may include a memory and a processor communicatively coupled with the memory. The processor may be configured to initiate a random access procedure, receive a first RACH message including a set of one or more RACH resources and configuration in response to the initiation, select a resource from the set of one or more RACH resources, and send a second RACH message based on the selected resource and a schedule of the UE.

In another aspect, the disclosure includes a user equipment (UE) for wireless communications (e.g., CV2X communications). The UE may include means to initiate a random access procedure, receive a first RACH message including a set of one or more RACH resources and configuration in response to the initiation, means to select a resource from the set of one or more RACH resources, and means to send a second RACH message based on the selected resource and a schedule of the UE.

In another aspect, the disclosure includes a non-transitory computer-readable medium storing computer-executable instructions executable by a processor. The computer-readable medium may include instructions to initiate a random access procedure, receive a first RACH message including a set of one or more RACH resources and configuration in response to the initiation, select a resource from the set of one or more RACH resources, and send a second RACH message based on the selected resource and a schedule of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
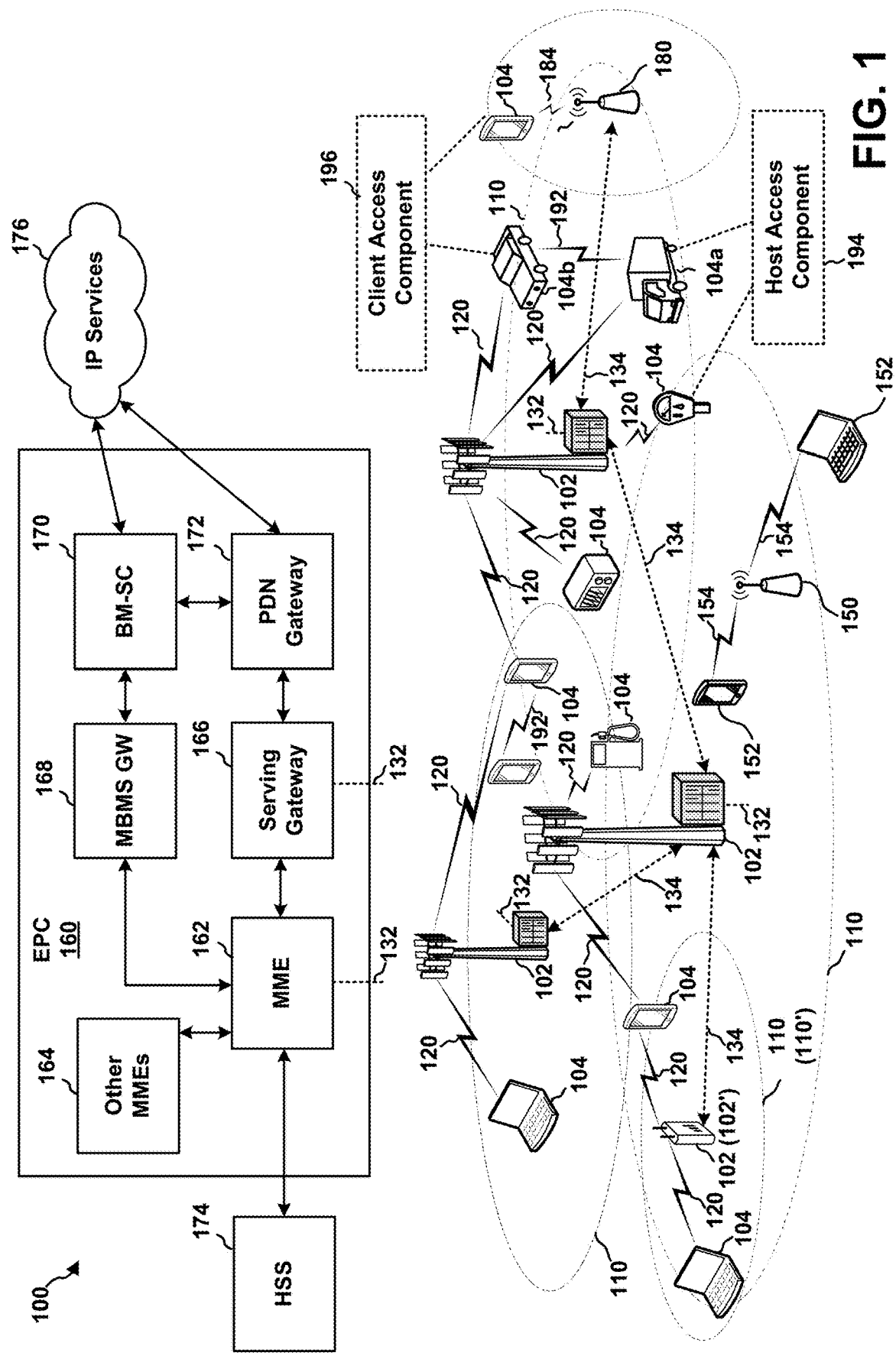
FIG. 1 is a block diagram illustrating an example of a wireless communications system and an access network.

Vehicle-to-everything (V2X) communications can be used when a vehicle communicates with one or more entities or devices that may affect the vehicle, and vice versa. In an example, V2X communication may incorporate a specific type of communications, such as vehicle-to-vehicle (V2V) communications or cellular vehicle-to-everything (CV2X) communications. For V2X communications, a random access procedure may be used to establish a V2X communication link after a discovery procedure. In an aspect, for example, a host device (e.g., a base station or user equipment (UE)) or a vehicle (e.g., a UE) may initiate the discovery or synchronization procedure by broadcasting one or more reference signals, which is similar to a base station that performs a discovery or synchronization procedure in an access network. In some examples, after the discovery procedure, a client device or vehicle (e.g., a second UE) may initiate a random access procedure to communicate with the host device. In some cases, resources for random access channel (RACH) messages, for example, message 3 (MSG3) and/or message 4 (MSG4), may be configured by the host device that receives the RACH preamble.

In some examples, for cellular V2X (CV2X) communications, the client device (or the device that initiated the RACH procedure) may be in communication with one or more devices other than the host device, and may have a respective schedule for the client device. In this case, the client device may not be always available to send MSG3 or scan for (or monitor/receive) MSG4 within the configured resources.

Accordingly, due to the requirements for increased data rates, lower latency, and higher system reliability, new and/or improved approaches may be desirable to improve RACH procedure, resource management, and enhance medium access, in order to satisfy consumer demand and improve user experience in wireless communications, for example, CV2X communications.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. Although an EPC 160 is illustrated, the wireless communications system may include a different core network, such as a 5G Core (5GC). References herein to the EPC 160 may also refer to a 5GC. The base stations 102 may include macro cells (high power cellular base station) and/or small cell base stations (low power cellular base station).

The base stations 102 (collectively referred to as Evolved Universal Mobile Telecommunications System (UMTS) Terrestrial Radio Access Network (E-UTRAN)) interface with the EPC 160 and/or 5GC through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 and/or 5GC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network. Additionally, UEs 104 performing D2D communications may operate using mmW and may also utilize beamforming 184.

A gNodeB (gNB) 180 and/or one or more UEs 104 may operate in millimeter wave (mmW) frequencies and/or near mmW frequencies in communication with a UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 and/or 5GC for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104a may include a host access component 194 for advertising CV2X services supported by the host UE 104. A client UE 104b may include a client access component 196 for discovering CV2X services supported by the host UE 104a and initiating an access procedure with the host UE 104. Moreover, a UE 104 may act as both a host and a client. For example, a vehicle may act as a host to provide speed and braking updates to surrounding vehicles and act as a client to communicate with a tolling station. Accordingly, a single UE 104 may include both a host access component 194 and a client access component 196. Further details of the host access component 194 and the client access component 196 are illustrated in FIG. 6 and FIG. 7.

Figure 6:
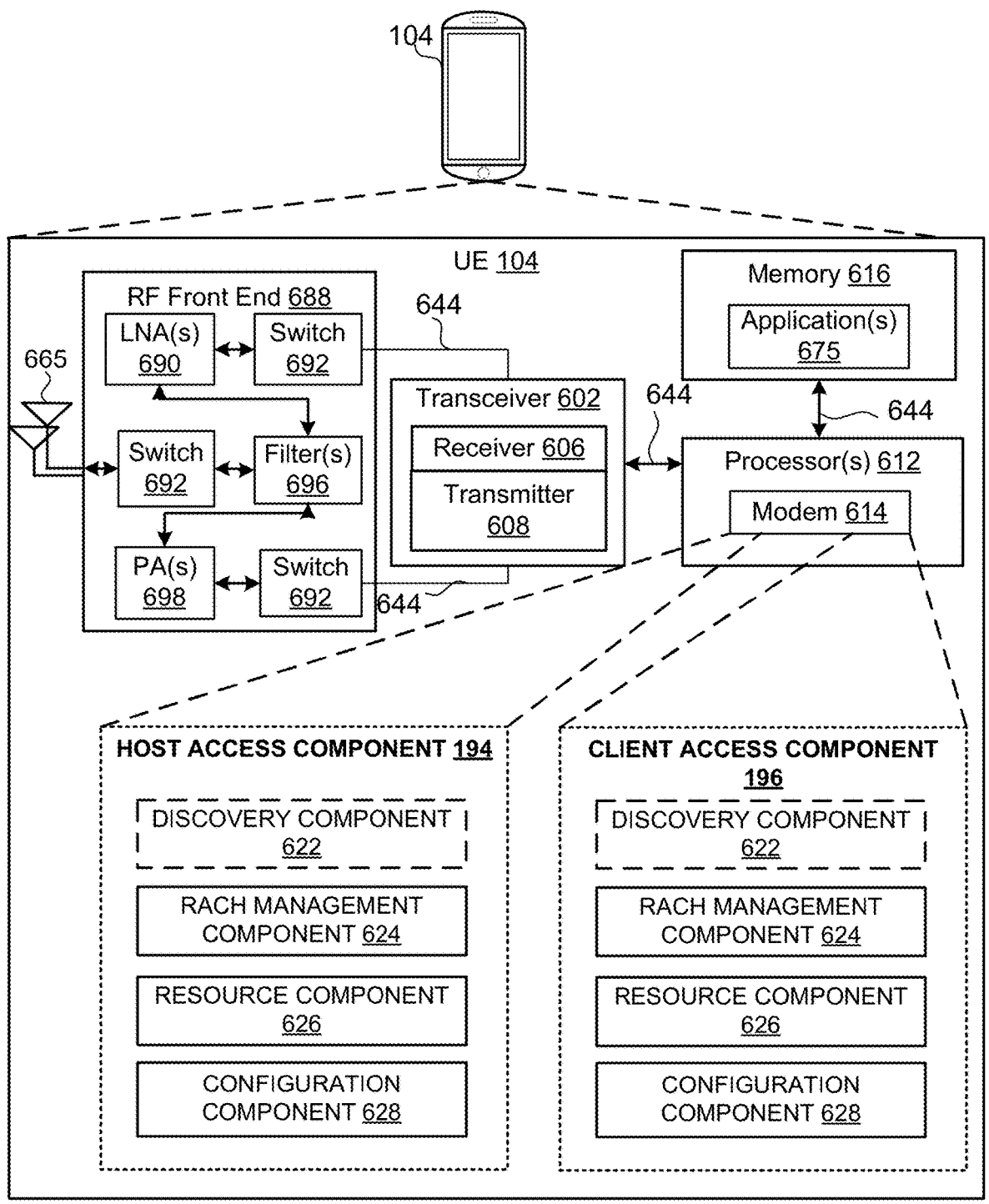
FIG. 6 is a schematic diagram of example components of the UE of FIG. 1.
Figure 7:
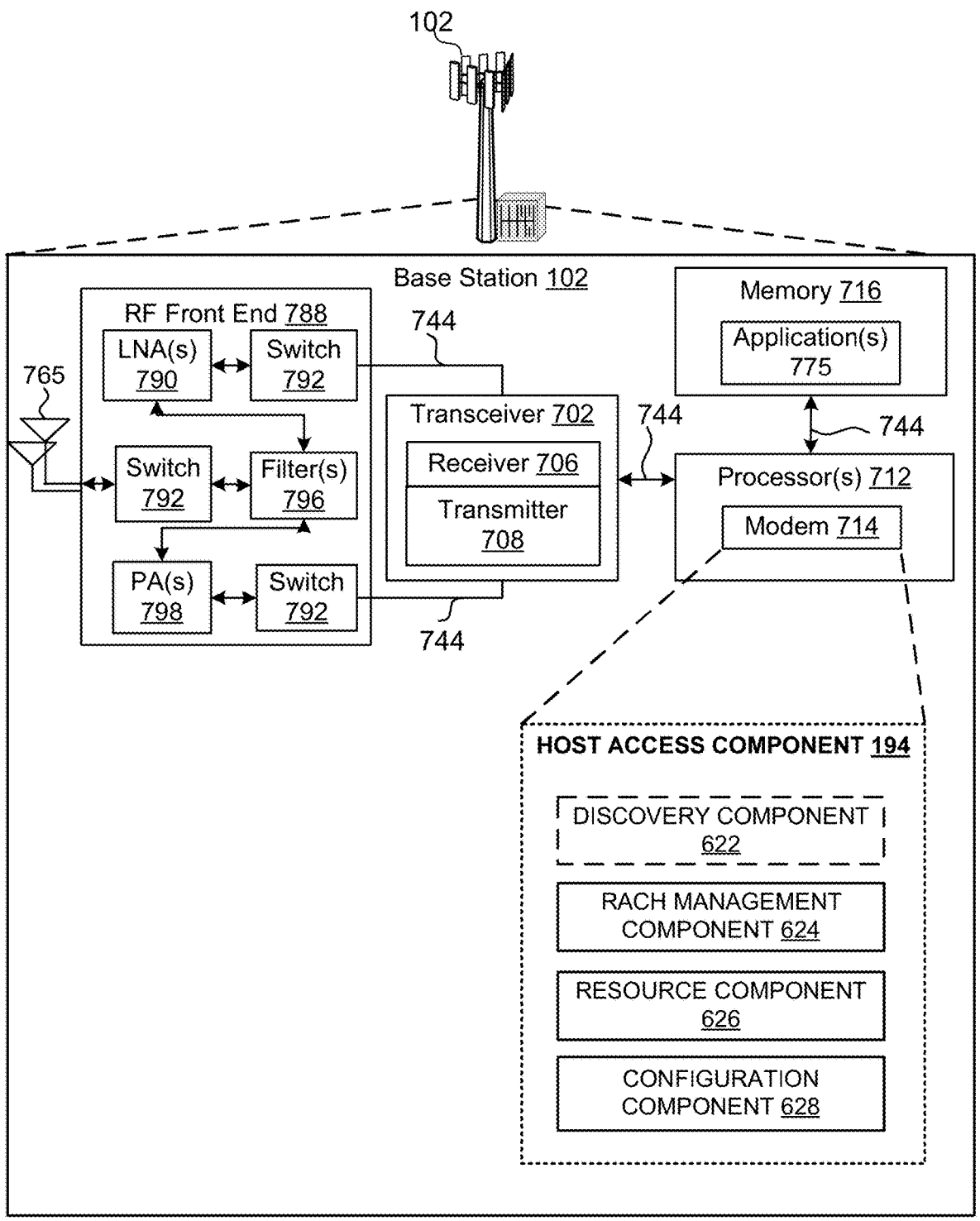
FIG. 7 is a schematic diagram of example components of the base station of FIG. 1.

Referring to FIG. 6 and FIG. 7, the host access component 194 may comprise one or more subcomponents, for example, a discovery component 622, RACH management component 624, resource component 626, and/or configuration component 628. In an aspect, the host access component 194 may configure the transceiver 602 and/or antenna(s) 665 to transmit a RACH message 2 (e.g., RACH message 320 in FIG. 3; e.g., RACH MSG 2) and/or a RACH message 4 (e.g., RACH message 324 in FIG. 3) to the client UE 104b. For example, RACH management component 624 may initiate an access procedure between the host UE 104a and the client UE 104b, and transmit RACH messages (e.g., RACH message 2 and/or RACH message 4) from the host access component 194 to the client UE 104b.

In an aspect, the host UE 104a and/or the host access component 194 may configure the transceiver 602 and/or antenna(s) 665 to receive a RACH message 3 (e.g., RACH message 322 in FIG. 3) from the client UE 104b, using the RACH management component 624 and/or resource component 626, based on the selected resource(s) by the client UE 104b.

In another aspect, the client access component 196 may comprise one or more subcomponents, for example, a discovery component 622, RACH management component 624, resource component 626, and/or configuration component 628. In an aspect, the client access component 196, shown in FIG. 6, may configure the transceiver 602 and/or antenna(s) 665 to receive a RACH message 2 (e.g., RACH message 320 in FIG. 3) and/or a RACH message 4 (e.g., RACH message 324 in FIG. 3) from the host UE 104a. For example, RACH management component 624 may initiate an access procedure between the host UE 104a and the client UE 104b, and receive RACH messages (e.g., RACH message 2 and/or RACH message 4) from the host UE 104a to the client access component 196.

In an aspect, the client UE 104b and/or the client access component 196 may configure the transceiver 602 and/or antenna(s) 665 to transmit a RACH message 3 (e.g., RACH message 322 in FIG. 3) to the host UE 104a, using the RACH management component 624 and/or resource component 626, based on the selected resource(s) by the resource component 626 at the client UE 104b.

In an aspect, the one or more resources discussed herein may be transmission resources or reception resources, or resources allocated by a base station or a UE for communication with other devices (e.g., another base station or UE). In some examples, the one or more resources may be a single TD or FD resource, or multiple TD or FD resources for transmission.

In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in an mmW communication system may be very short (e.g., 150-200 meters between gNBs). The short distances may result in a short amount of time required for a fast handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield may act as obstacles to maintaining the LOS.

Figure 2:
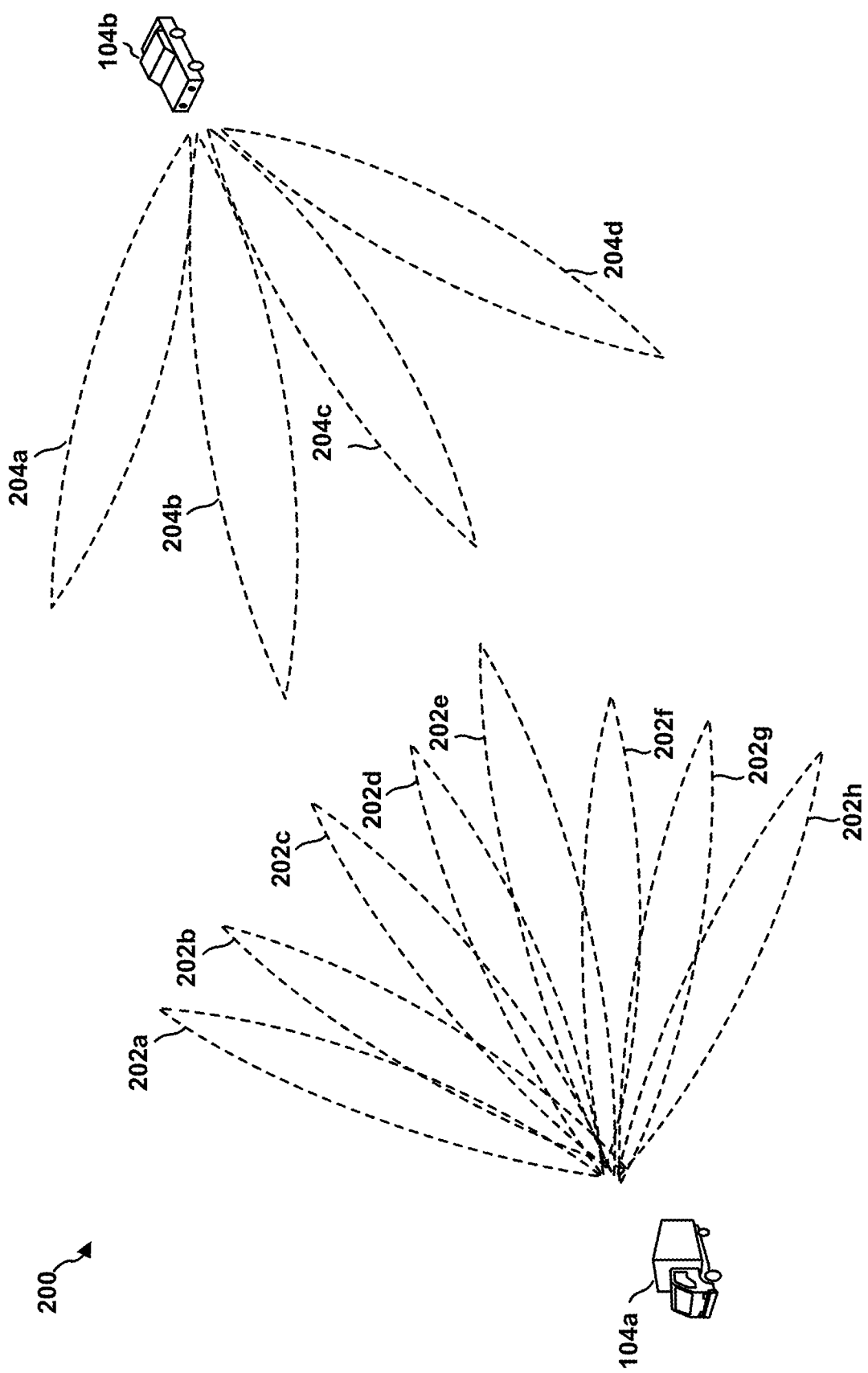
FIG. 2 is a block diagram of example UEs communicating using beamforming.

FIG. 2 is a diagram 200 illustrating a host UE 104a in communication with a client UE 104b. Referring to FIG. 2, the host UE 104a may transmit one or more beams 202a, 202b, 202c, 202d, 202e, 202f, 202g, and/or 202h to the client UE 104b, where the beams may be in one or more directions. The client UE 104b may receive the one or more beams 202a-202h in the same direction as transmitted by the host UE 104a or in another direction due to reflection. The client UE 104b may also transmit one or more beams 204a, 204b, 204c, and/or 204d to the host UE 104a, where the beams may be in one or more directions. The host UE 104a may receive at least one of the one or more beams 204a-204d in the same direction as transmitted by the client UE 104b or in another direction due to reflection. The host UE 104a and/or the client UE 104b may perform beam training to determine the best beams for each of the host UE 104a/the client UE 104b to transmit/receive. For example, by providing feedback regarding a strongest beam.

The use of beamforming may impact discovery signals for CV2X communication. In some conventional D2D systems, discovery signals are broadcast by a host device to allow other devices to discover services offered by the host device. When beamforming is used to transmit a discovery signal, devices that are not positioned directly within the beam may not receive the signal. In an aspect, multiple transmissions of a discovery signal may be used to perform beam sweeping by transmitting the discovery signal in different directions. The multiple transmissions, however, may increase resource usage for the discovery signal.

Figure 3:
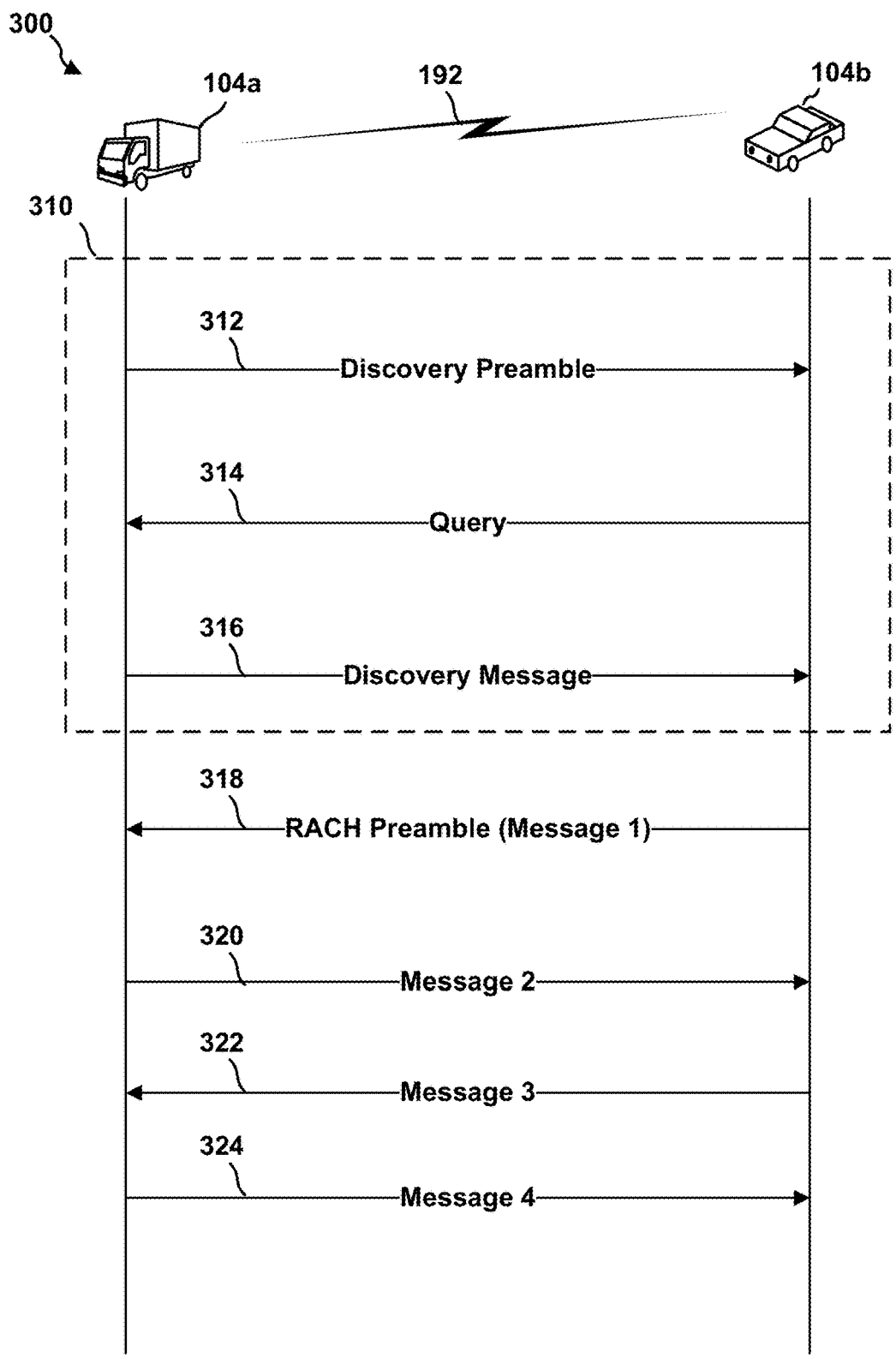
FIG. 3 is a message diagram showing an example of discovery and connection setup between UEs.

FIG. 3 is a message diagram 300 illustrating example signals that may be used for discovery and connection establishment between the host UE 104a and the client UE 104b. Although the illustrated example shows a host UE 104a, in an aspect, a base station 102 may be a host and perform the actions of a host UE 104a as described below. In an aspect, one or more discovery signals may utilize preconfigured discovery resources 310. In a CV2X system, a host UE 104a may not have information regarding the other UEs 104b with which the host UE 104a may want to communicate. By using the preconfigured discovery resources 310, the UEs 104 may limit a search space for discovering other UEs 104 and reduce overhead associated with discovery signals. Further, the discovery signals may reduce overhead by limiting discovery signal transmission unless a host UE 104a receives an indication that a device (e.g., a client UE 104b) is present that is interested in receiving the discovery signal. The discovery signals utilizing the preconfigured discovery resource 310 may include a discovery preamble 312, a query 314, a discovery message 316, and a RACH preamble 318. The RACH preamble 318 may also be referred to as a RACH Message 1 (e.g., RACH MSG 1).

A discovery preamble 312 may be a transmission from a host UE 104a indicating that the host UE 104a is capable of communicating (e.g., offering a service). For example, the discovery preamble 312 may be one predefined sequence selected from a set of predefined sequences. The selection of the predefined sequence may convey a limited amount of information. For example, the discovery preamble 312 may be selected based on a type of the host UE 104a or a type of service offered by the host UE 104a. In some examples, the host UE 104a may transmit the discovery preamble 312 using discovery preamble resources within the preconfigured discovery resources 310. The host UE 104a may select which beams to use for the discovery preamble to attempt to reach potentially interested devices (e.g., one or more client UEs 104b).

A query 314 may be a transmission from a client UE 104b indicating that the client UE 104b is interested in obtaining further information from the host UE 104a. For example, the query 314 may be a preamble or other defined sequence transmitted by the client UE 104b on query resources corresponding to the discovery preamble resources 310. The client UE 104b may transmit the query 314 on the corresponding query resources upon receiving a discovery preamble in which the client UE 104b is interested. For example, the client UE 104b may transmit the query 314 in response to one or more preambles indicating certain types of devices or services. The client UE 104b may use beamforming for the query 314 based on the received discovery preamble 312 (e.g., using channel estimation and beam training). The host UE 104a may listen for queries 314 on the corresponding query resources.

A discovery message 316 may be a transmission from the host UE 104a providing information regarding one or more services offered by the host UE 104a. The host UE 104a may transmit the discovery message 316 in response to receiving the query 314. The discovery message 316 may include more information than the discovery preamble 312 and may be transmitted using beamforming based on the query 314. For example, the discovery message 316 may include details regarding the service offered by the host UE 104a. By transmitting the larger portion of the discovery information in the discovery message 316 only in response to the query 314, the host UE 104a may limit the discovery resources used. In an aspect, resources designated for transmission of a discovery message 316 may be repurposed (e.g., used for data for an existing connection) when the discovery message 316 is not transmitted. Additionally, since beamforming of the discovery message 316 may be based on the query 314, the host UE 104a may avoid repetitions of the discovery message 316 on multiple beams, further reducing the resources used for discovery.

A RACH preamble 318 may be a transmission from the UE 104b seeking to establish communications with the host UE 104a. The RACH preamble 318 may also be referred to as a RACH message 1 and may perform a similar role as a conventional RACH message 1. The RACH preamble 318, however, may be transmitted on the preconfigured discovery resources 310 rather than a dedicated RACH physical channel. In some examples, the resources defined for the RACH preamble 318 may also be repurposed when the RACH preamble 318 is not transmitted.

The host UE 104a and client UE 104b may complete a RACH procedure based on the information obtained from the discovery procedure discussed above. Alternatively, a CV2X RACH procedure may follow other discovery procedures. The RACH procedure may include the RACH preamble 318 (e.g., RACH Message 1), RACH message 320

(e.g., RACH message 2), RACH message 322 (e.g., RACH message 3), and RACH message 324 (e.g., RACH message 4).

RACH message 320 (e.g., RACH message 2) may be transmitted by the host UE 104a in response to the RACH preamble 318 to indicate resources to be used by the client UE 104b for sending RACH message 322 (e.g., RACH message 3) and for receiving RACH message 324 (e.g., RACH message 4). RACH message 322 (e.g., RACH message 3) may be transmitted by the client UE 104b and may include a control channel and a data channel providing identification information for the client UE 104b. RACH message 324 (e.g., RACH message 4) may set up a radio resource control (RRC) connection between the host UE 104a and the client UE 104b that can be used for further communications.

Still referring to FIG. 3, the message diagram 300 illustrates example signals or messages that may be used for random access procedure in CV2X communications between the host UE 104a and the client UE 104b. For example, in a random access procedure (e.g., a RACH procedure), a few signaling (e.g., RACH message 3 322, RACH message 4 324) may be used to resolve contentions or potential contentions among multiple RACH devices (e.g., the host UE 104a and the client UE 104b). In an aspect, resources for transmission of RACH message 322 (e.g., RACH message 3) may be provided by the host UE 104a in RACH message 320 (e.g., RACH message 2). In some examples, resources used for receiving RACH message 324 (e.g., RACH message 4) may also be provided by the host UE 104a to the client UE 104b.

For CV2X communications, in an example, the client UE 104b may be in communication with other devices (e.g., devices other than the host UE 104a), and may have a respective schedule for the client UE 104b. In some cases, it may not be always available to send RACH message 322 (e.g., RACH message 3), or scan for RACH message 324 (e.g., RACH message 4), within the configured resources. In an aspect, resources and/or configurations for RACH message 322 (e.g., RACH message 3) may be identified or determined. The host UE 104a may provide a set of resources and configuration in RACH message 320 (e.g., RACH message 2) or an earlier message (e.g. the discovery message), where the host UE 104a expects to receive in RACH message 322 (e.g., RACH message 3). In an example, the set contains a single resource and/or configuration, which is the same as an access network (e.g., access network 100, an LTE network, a 5G NR network) design. In an aspect, the single resource and/or configuration may be in time-domain (TD) or frequency-domain (FD). In another example, the set contains multiple (TD or FD) resources and/or configurations. In this case, the client UE 104b may pick a resource out of the given set (provided in RACH message 320 (e.g., RACH message 2)), based on the own schedule of the client UE 104b.

In an aspect, RACH message 322 (e.g., RACH message 3) may contain a data channel, and may additionally contain a control channel. The configured resources may be for the control channel (if present) and/or the data channel. The control channel (if present) may provide the resource and configuration for the transmission of the corresponding data channel. For example, a single or multiple TD or FD resources may be configured for the data channel (including potentially multiple FD resources per TD resource), and the transmitted control channel may indicate the selected resources (in both TD and FD) for the transmission of the data channel.

In some cases, the resources and/or configurations may be used for one or multiple retransmissions (e.g., hybrid automatic repeat request (HARD) configuration).

Described herein are various aspects related to resources and/or configuration(s) for RACH message 324 (e.g., RACH message 4). In an example, the host UE 104a may provide a set of resources/configuration in RACH message 320 or an earlier message during the discovery process, for the host UE 104a to send on RACH message 324 (e.g., RACH message 4). In an aspect, for example, the set of resources/ configuration may contain a single TD or FD resource. In another aspect, the set of resources/configuration may contain multiple TD or multiple FD resources (e.g., a window). For example, a candidate set may be divided into different subsets, and the client UE 104b may indicate a preference in RACH message 322 (e.g., RACH message 3) or an earlier signal or message (e.g. RACH preamble, or a query signal). In another example, the client UE 104b, in RACH message 322 (e.g., RACH message 3), may provide a set of resources where the client UE 104b expects to receive RACH message 324 (e.g., RACH message 4). In some cases, the set contains a single resource. In some other cases, the set contains multiple TD resource or multiple FD resources.

In an aspect, same approaches for random access resources may be applied to configurations of the UE (e.g., modulation and coding scheme (MCS), numerology, beam-related information). In some examples, RACH message 324 (e.g., RACH message 4) may contain both control and data channels, which is same scheme as discussed herein may be used and may be separately or jointly applied to the control and data parts. In some cases, resources and configurations for RACH message 324 (e.g., RACH message 4) retransmissions (e.g., HARQ transmissions) may also be supported and used.

In an aspect, as discussed above, the host UE 104a may provide a set of resources and/or configurations where the client UE 104b expects to receive via messages, such as RACH message 320 (e.g., RACH message 2) and/or RACH message 324 (e.g., RACH message 4). In some example, the host UE 104a may provide the set of resources and/or configurations in a RACH message 320 (e.g., RACH message 2), or a discovery message (e.g., discovery message 316), or an earlier signal (e.g., a master information block (MIB) or a system information block (SIB)). In some implementations, one or more RACH messages may be indicated by either of the host UE 104a or the client UE 104b in their initial communications, including at least one of discovery preamble (e.g., discovery preamble 312), query (e.g., query 314), discovery message (e.g., discovery message 316), RACH preamble (e.g., RACH preamble 318), or RACH message 320 (e.g., RACH message 2).

In some examples, the random access resources may be based on one or more wireless communication standards. In some aspects, the methods, techniques, or schemes discussed herein may be within the limits of current specifications of various wireless communication standards (e.g., 3GPP standards). In some examples, the techniques or methods discussed herein may be implemented by or reside in hardware or software at a user equipment (UE) or a base station.

Figure 4:
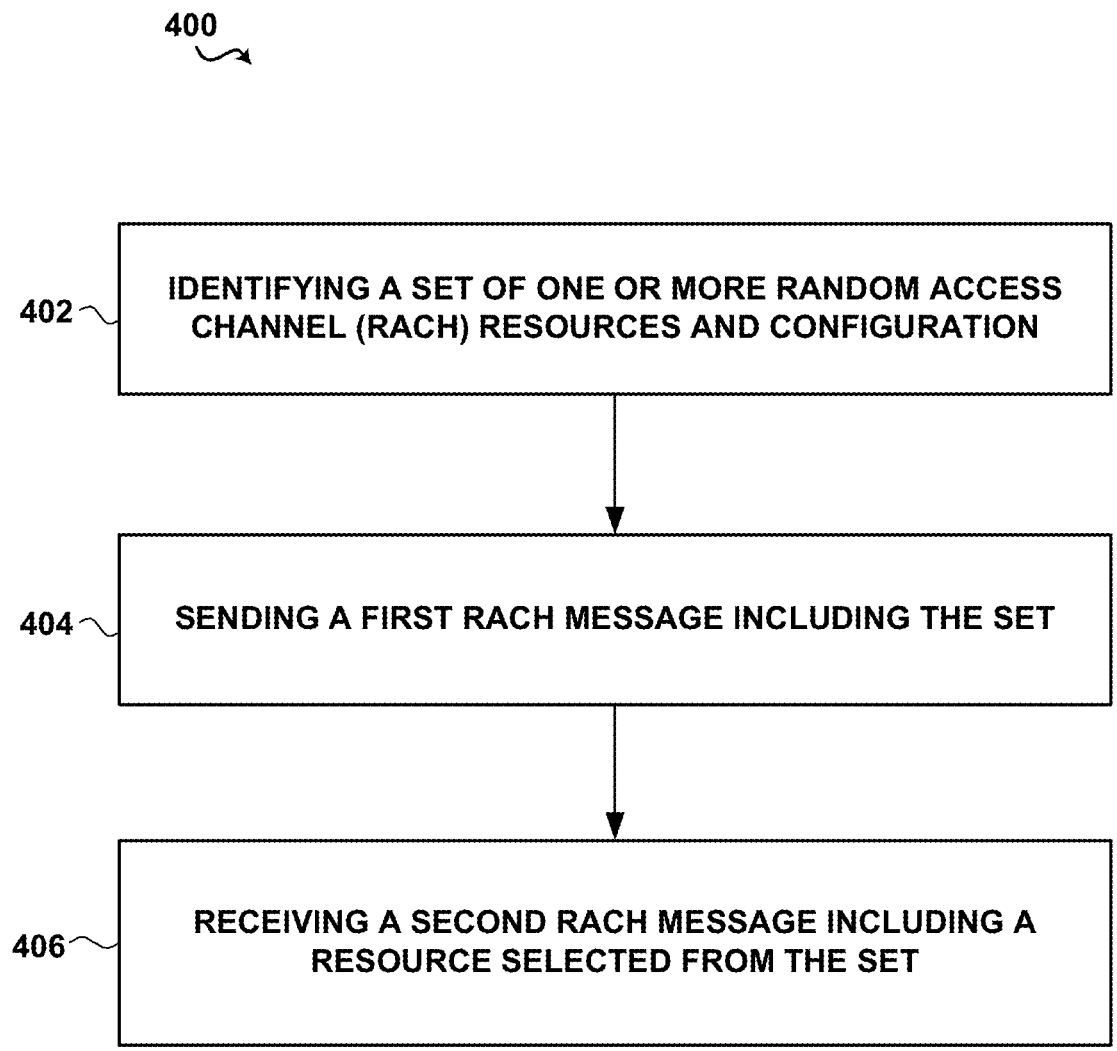
FIG. 4 is a flowchart of an example method of wireless communications by a host device, such as a UE or a base station.

Referring to FIG. 4, in an operational aspect, a host device, such as UE 104 (e.g., a host UE 104a) or a base station 102 in FIG. 1, may perform one or more aspects of a method 400 for resource configuration for random access in a wireless communication system (e.g., a CV2X communication system). For example, one or more of the processors 612, memory 616, modem 614, transceiver 602, host access component 194, discovery component 622, RACH management component 624, resource component 626, and/or configuration component 628, may be configured to perform aspects of the method 400. In another example, one or more of the processors 712, memory 716, modem 714, transceiver 702, host access component 194, discovery component 622, RACH management component 624, resource component 626, and/or configuration component 628, may be configured to perform aspects of the method 400.

In an aspect, at block 402, the method 400 may include identifying a set of one or more RACH resources and configuration. In an aspect, for example, the host access component 194, resource component 626, and/or configuration component 628, e.g., in conjunction with one or more of the processors 612 (or one or more processors 712), memory 616 (or memory 716), modem 614 (or modem 714), and/or transceiver 602 (or transceiver 702), may be configured to identify a set of one or more RACH resources and configuration. In an example, the set of one or more RACH resources and configuration may comprise a single (e.g., TD or FD) resource and/or a single configuration. In another example, the set of one or more RACH resources and configuration may comprise multiple (e.g., TD or FD) resources and/or configurations.

In an aspect, at block 404, the method 400 may include sending a first RACH message including the set. In an aspect, for example, the host access component 194, and/or RACH management component 624, e.g., in conjunction with one or more of the processors 612 (or one or more processors 712), memory 616 (or memory 716), modem 614 (or modem 714), and/or transceiver 602 (or transceiver 702), may be configured to send a first RACH message including the set.

In another aspect, at block 406, the method 400 may include receiving a second RACH message including a resource selected from the set. In an aspect, for example, the host access component 194, RACH management component 624, and/or resource component 626, e.g., in conjunction with one or more of the processors 612 (or one or more processors 712), memory 616 (or memory 716), modem 614 (or modem 714), and/or transceiver 602 (or transceiver 702), may be configured to receive a second RACH message including a resource selected from the set.

Figure 5:
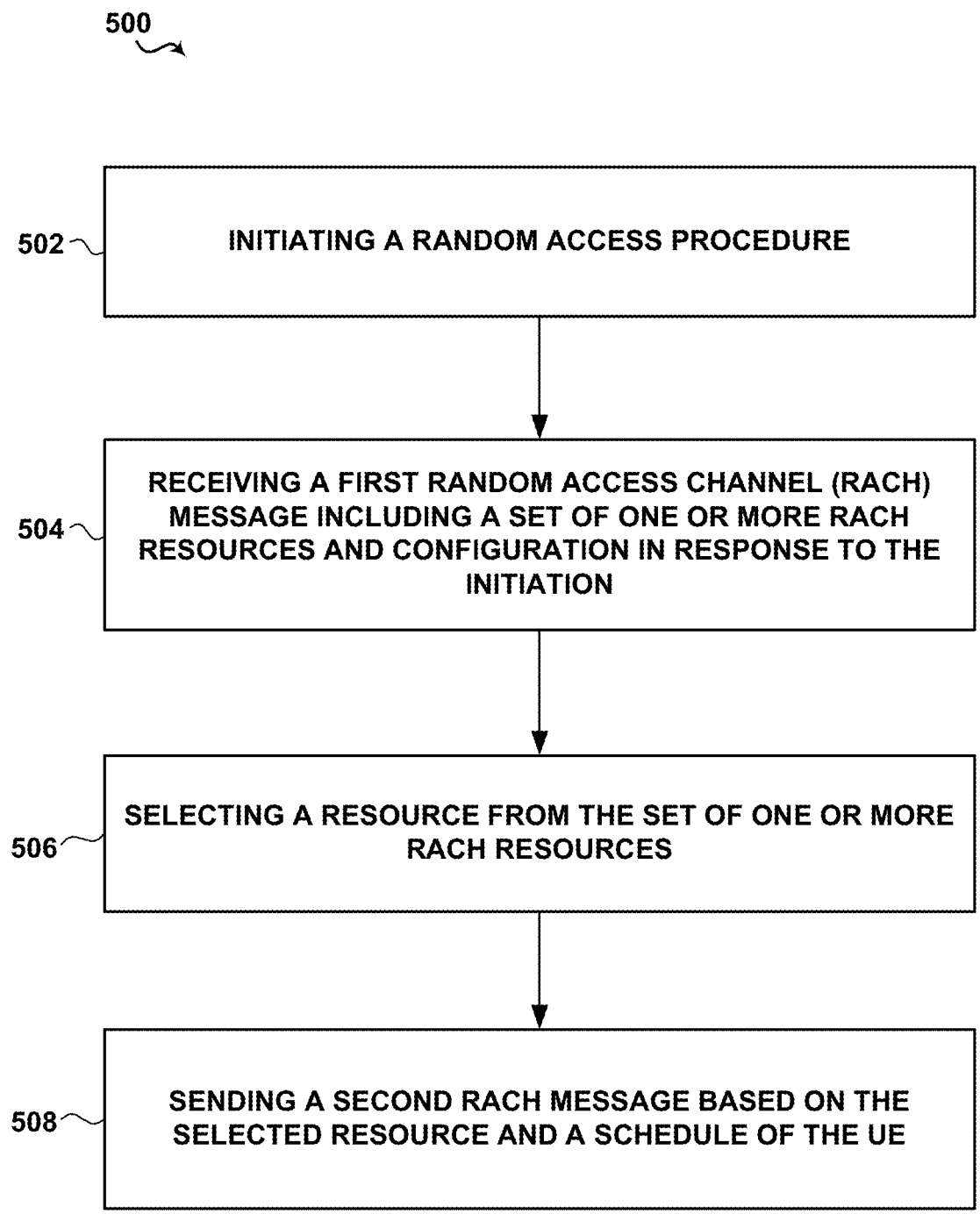
FIG. 5 is a flowchart of an example method of wireless communications by a client UE.

Referring to FIG. 5, in an operational aspect, a UE, such as UE 104 or a client UE 104b in FIG. 1, may perform one or more aspects of a method 500 for resource configuration for random access in a wireless communication system (e.g., a CV2X communication system). For example, one or more of the processors 612, memory 616, modem 614, transceiver 602, client access component 196, discovery component 622, RACH management component 624, resource component 626, and/or configuration component 628, may be configured to perform aspects of the method 500.

In an aspect, at block 502, the method 500 may include initiating a random access procedure. In an aspect, for example, the client access component 196, and/or RACH management component 624, e.g., in conjunction with one or more of the processors 612, memory 616, modem 614, and/or transceiver 602, may be configured to initiate a random access procedure.

In an aspect, at block 504, the method 500 may include receiving a first RACH message including a set of one or more RACH resources and configuration in response to the initiation. In an aspect, for example, the client access component 196, RACH management component 624, resource component 626, and/or configuration component 628, e.g., in conjunction with one or more of the processors 612, memory 616, modem 614, and/or transceiver 602, may be configured to receive a first RACH message including a set of one or more RACH resources and configuration in response to the initiation. In an example, the set of one or more RACH resources and configuration may comprise a single (e.g., TD or FD) resource and/or a single configuration. In another example, the set of one or more RACH resources and configuration may comprise multiple (e.g., TD or FD) resources and/or configurations.

In another aspect, at block 506, the method 500 may include selecting a resource from the set of one or more RACH resources. In an aspect, for example, the client access component 196, RACH management component 624, and/or resource component 626, e.g., in conjunction with one or more of the processors 612, memory 616, modem 614, and/or transceiver 602, may be configured to select a resource from the set of one or more RACH resources.

In an aspect, at block 508, the method 500 may include sending a second RACH message based on the selected resource and a schedule of the UE. In an aspect, for example, the client access component 196, RACH management component 624, and/or resource component 626, e.g., in conjunction with one or more of the processors 612, memory 616, modem 614, and/or transceiver 602, may be configured to transmit a second RACH message based on the selected resource and a schedule of the UE.

Referring to FIG. 6, one example of an implementation of UE 104 may include a variety of components, some of which have already been described above, but including components such as one or more processors 612 and memory 616 and transceiver 602 in communication via one or more buses 644, which may operate in conjunction with modem 614, a host access component 194, and a client access component 196 to enable one or more of the functions described herein related to discovery procedures, resource management, and/or random access in CV2X communications. Further, the one or more processors 612, modem 614, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 614 that uses one or more modem processors. The various functions related to host access component 194 and client access component 196 may be included in modem 614 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with host access component 194 and client access component 196 may be performed by transceiver 602.

Also, memory 616 may be configured to store data used herein and/or local versions of applications 675, host access component 194, client access component 196, and/or one or more of the subcomponents of host access component 194 or client access component 196 being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining host access component 194, client access component 196 and/or one or more of subcomponents thereof, and/or data associated therewith, when UE 104 is operating at least one processor 612 to execute host access component 194 and client access component 196 and/or one or more subcomponents thereof.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 102. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 104 may include RF front end 688, which may operate in communication with one or more antennas 665 and transceiver 602 for receiving and transmitting radio transmissions, for example, wireless communications transmitted by at least one base station 102 or wireless transmissions transmitted by UE 104. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 104 can communicate with, for example, one or more base stations 102 or one or more cells associated with one or more base stations 102. In an aspect, for example, modem 614 can configure transceiver 602 to operate at a specified frequency and power level based on the UE configuration of the UE 104 and the communication protocol used by modem 614.

In an aspect, modem 614 can be a multiband-multimode modem, which can process digital data and communicate with transceiver 602 such that the digital data is sent and received using transceiver 602. In an aspect, modem 614 can be multiband and be configured to support multiple frequency bands for a specific communications protocol. In an aspect, modem 614 can be multimode and be configured to support multiple operating networks and communications protocols. In an aspect, modem 614 can control one or more components of UE 104 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 7, one example of an implementation of base station 102 may include a variety of components, some of which have already been described above, but including components such as one or more processors 712 and memory 716 and transceiver 702 in communication via one or more buses 744, which may operate in conjunction with modem 714 and host access component 194 to enable one or more of the functions described herein related to CV2X discovery and/or random access procedures.

The transceiver 702, receiver 706, transmitter 708, one or more processors 712, memory 716, applications 1075, buses 744, RF front end 788, LNAs 790, switches 792, filters 796, PAs 798, and one or more antennas 765 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications for a host device, comprising:
   identifying a set of multiple random access channel (RACH) resources and configurations;
   sending a first RACH message including the set; and
   receiving a second RACH message including an indication indicating a preference of a resource selected from the set, wherein the second RACH message includes another set of resources for use in sending a third RACH message.

2. The method of claim 1, wherein the set of multiple RACH resources and configurations is for control channel, or data channel, or both.

3. The method of claim 1, further comprising:
   sending a third RACH message based on the indication.

4. The method of claim 1, wherein the multiple RACH resources comprise multiple time-domain RACH resources.

5. The method of claim 1, wherein the multiple RACH resources comprise multiple frequency-domain RACH resources.

6. The method of claim 1, wherein the first RACH message is a RACH message 2 (MSG2) message, and the second RACH message is a RACH message 3 (MSG3) message.

7. The method of claim 1, wherein the first RACH message is a RACH message 3 (MSG3) message, and the second RACH message is a RACH message 4 (MSG4) message.

8. A host device for wireless communications, comprising:
   a memory; and
   a processor communicatively coupled with the memory and configured to:
     identify a set of multiple random access channel (RACH) resources and configurations;
     send a first RACH message including the set; and
     receive a second RACH message including an indication indicating a preference of a resource selected from the set, wherein the second RACH message includes another set of resources for use in sending a third RACH message.

9. The host device of claim 8, wherein the set of multiple RACH resources and configurations is for control channel, or data channel, or both.

10. The host device of claim 8, wherein the processor is further configured to:
    send a third RACH message based on the indication.

11. The host device of claim 8, wherein the multiple RACH resources comprise multiple time-domain RACH resources.

12. The host device of claim 8, wherein the multiple RACH resources comprise multiple frequency-domain RACH resources.

13. The host device of claim 8, wherein the first RACH message is a RACH message 2 (MSG2) message, and the second RACH message is a RACH message 3 (MSG3) message.

14. The host device of claim 8, wherein the first RACH message is a RACH message 3 (MSG3) message, and the second RACH message is a RACH message 4 (MSG4) message.

15. A method of wireless communications for a user equipment (UE), comprising:
    initiating a random access procedure;
    receiving a first random access channel (RACH) message including a set of multiple RACH resources and configurations in response to the initiation;
    selecting a resource from the set of multiple RACH resources; and
    sending a second RACH message based on the selected resource and a schedule of the UE and the second RACH including an indication indicating a preference of the selected resource and includes another set of resources for use in sending a third RACH message.

16. The method of claim 15, wherein the set of multiple RACH resources and configurations is for control channel, or data channel, or both.

17. The method of claim 15, further comprising:
    receiving a third RACH message based on the indication.

18. The method of claim 15, wherein the multiple RACH resources comprise multiple time-domain RACH resources.

19. The method of claim 15, wherein the multiple RACH resources comprise multiple frequency-domain RACH resources.

20. The method of claim 15, wherein the first RACH message is a RACH message 2 (MSG2) message, and the second RACH message is a RACH message 3 (MSG3) message.

21. The method of claim 15, wherein the first RACH message is an RACH message 3 (MSG3) message, and the second RACH message is an RACH message 4 (MSG4) message.

22. A user equipment (UE) for wireless communications, comprising:
    a memory; and
    a processor communicatively coupled with the memory and configured to:
      initiate a random access procedure;
      receive a first random access channel (RACH) message including a set of multiple RACH resources and configurations in response to the initiation;
      select a resource from the set of multiple RACH resources; and
      send a second RACH message based on the selected resource and a schedule of the UE and the second RACH including an indication indicating a preference of the selected resource and includes another set of resources for use in sending a third RACH message.

23. The UE of claim 22, wherein the set of multiple RACH resources and configurations is for control channel, or data channel, or both.

24. The UE of claim 22, wherein the processor is further configured to:
    receive a third RACH message based on the indication.

25. The UE of claim 22, wherein the multiple RACH resources comprise multiple time-domain RACH resources.

26. The UE of claim 22, wherein the multiple RACH resources comprise multiple frequency-domain RACH resources.

27. The UE of claim 22, wherein the first RACH message is a RACH message 2 (MSG2) message, and the second RACH message is a RACH message 3 (MSG3) message.

28. The UE of claim 22, wherein the first RACH message is an RACH message 3 (MSG3) message, and the second RACH message is an RACH message 4 (MSG4) message.

* * * * *